United States Patent Office 3,783,003
Patented Jan. 1, 1974

3,783,003
PROCESS FOR PRODUCING A RESIN-COATED PAPER AS A SUPPORT FOR A PHOTOGRAPHIC PAPER
Tsuneyasu Matsuhisa and Yoshiaki Nagai, Kanagawa, Japan, assignors to Fuji Photo Film Co., Ltd., Kanagawa, Japan
No Drawing. Filed June 17, 1971, Ser. No. 154,161
Claims priority, application Japan, June 17, 1970, 45/52,607
Int. Cl. B44d 1/16
U.S. Cl. 117—76 P                      3 Claims

ABSTRACT OF THE DISCLOSURE

A resin-coated paper as a support for a photographic paper, which has good adhesion between the paper and the resin layers and gives photographic paper free from fogging, is prepared by the extrusion coating in which the first resin is coated at an extrusion temperature over 320° C. on the side of the paper to be coated with the photographic emulsions and then the second resin is coated at a temperature under 300° C. on the first resin layer.

BACKGROUND OF THE INVENTION

(1) Field of the invention

This invention relates to a process for producing a support for a photographic paper.

(2) Description of the prior art

A baryta paper has been used as a support for a photographic paper. The photographic paper with a baryta paper, however, had the defects that the speed of processing is limited and the photographic emulsion layers frequently turn yellow during storage of the processed photographic paper, because the processing solutions penetrate into the paper during processing, such as, development or fixation, and partly remain in the paper after processing. To avoid such defects, a "resin-coated paper" has come into use as a support for a photographic paper. The "resin-coated paper" is paper with resin layers on one surface or both surfaces, and because of the waterproof property, both surfaces resin-coated paper is used for a photographic paper. One process for producing a resin-coated paper is extrusion coating which involves melting thermoplastic resin, such as, polyethylene, in the extruder, extruding the molten resin through the die, and forcing the resin against the paper in the nip consisting of the cooling roll and the pressure roll.

For the resin-coated paper as a support for a photographic paper, sufficient adhesion between the paper and the resin layers is required in order that the resin layers are not stripped off from the paper during processing, i.e., development fixation, washing and drying. In addition, the resin must not affect the photographic emulsions to ensure the performance of the photographic paper.

Good adhesion between the paper and the resin layers is obtained with high resin temperature, because the viscosity of the molten resin decreases and the surface of the resin is activated. On the other hand, however, the higher the extrusion temperature is, the more the decomposition and the oxidation of the resin occurs, and the resultant products cause fogging of the photographic emulsions and prevent adhesion between the resin layers and the photographic emulsion. From the view point of the good performance of a photographic paper, therefore, low extrusion temperature is desirable.

It is an object of this invention to provide a resin-coated paper which has a sufficient adhesion between the paper and the resin layers for a photographic paper's support and give a photographic paper of good photographic properties.

SUMMARY OF THE INVENTION

The object of this invention can be achieved by the process in which the resin layers on the side of the paper to be coated with the photographic emulsions are formed with the first layer and the second layer, the first resin layer is coated at an extrusion temperature over 320° C., and then the second resin layer is coated at a temperature under 300° C. on the first layer. When the first resin is coated on the paper, high temperature over 320° C. gives good adhesion between the paper and the first layer. On the other hand, the second resin is coated at low temperature under 300° C., and, therefore, the decomposition and the oxidation of the resin are prevented and the resultant resin layer does not affect the photographic emulsions. The adhesion between the first layer and the second layer is very good at the temperature under 300° C. because polymer is coated on a polymer layer.

In the extrusion coating, generally, a temperature over 350° C. should be avoided because the resin is decomposed in the extruder or die, and the temperature under 260° C. should be also avoided because the adhesion between resin layers is poor even if the polymer is coated on a polymer layer.

In this process, it is preferable to use a high quality paper for photographic purposes having a thickness of about 100 to 250μ. As for the first resin, it is desirable to use a resin, for example, low density polyethylene with high melt index, ethylene-vinyl acetate copolymer or ethylene-acrylic acid copolymer, which adheres firmly to a paper. And as for the second resin, because of the good adhesion property between the first layer and the second layer and the good performance of the photographic paper, it is preferable to use polyethylenes of low density or high density. The resins for the first layer and the second layer may contain pigments, such as, titanium oxide, zinc oxide or zinc sulfide, dyestuffs, such as, chromophthal Blue A3R (product of Ciba Limited, Switzerland), fluorescent brigtening agents, such as, Uritex OB (product of Ciba Limited), or antistatic agents, such as, Electrostopper TS (product of Kas Soap Co., Ltd., Japan).

The invention will be described in more detail by the following examples in which the bond strength and the fog density were measured by the following methods.

Measurement of bond strength

The measurement was made in accordance with ASTM D-903. A test piece having a width of 2.5 cm. was used, and the resin layer was stripped off from paper at a rate of 15 cm./min. A force to resist the stripping at an angle of 180° was defined as the bond strength. The atmosphere at the time of measurement was at 25° C. and 50% RH.

Measurement of fog density

A test piece of support was subjected to corona discharging (voltage 20,000 v.; amount treated 1 kw./cm.² 10 m./min.), and an emulsion for chlorobromide paper (Technical Committee, Japan Industrial Society for Manufacturing Photographic Materials) was coated on the test piece so treated. The test piece was cut into two portions. One of them was fixed without developing, and the other was allowed to stand for 48 hours at 50° C. and 80% RH, developed with Fuji Developer FD-105 (Fuji) at 20° C. for 90 seconds, and then fixed. The difference in density between both samples was defined as fog or fog density.

The emulsion used in this test was prepared by the following procedure.

Solution (1):
```
Distilled water _____ cc__  600
Gelatin _____ g__    74
Sodium chloride _____ g__   7.6
Potassium bromide _____ g__   8.9
Citric acid (10%) _____ cc__   10
```
Solution (2):
```
Distilled water _____ cc__  200
Silver nitrate _____ g__    25
```

Solution (2) held at 40° C. was poured over two minutes into solution (1) held at 62° C. The mixed solution was ripened at 62° C. for 30 minutes, cooled, coagulated, attenuated, and washed with flowing water at 15° C. for 30 minutes. Ten grams of gelatin was added to the resulting emulsion, and water was added to make a total amount of one kilogram. The emulsion was then ripened again at 62° C. for 30 minutes. (See Goro Miyamoto, "Photographic Materials and Method of Handling," p. 80, Kyoritsu Publishing Co., Ltd.)

Example 1

High pressure polyethylene [Sumikathene L-705 (melt index 7, density 0.919 g./cm.$^3$, product of Sumitomo Chemical Co., Ltd.)] was coated in a thickness of 15$\mu$ on paper having a unit weight of 170 g./m.$^2$, at 335° C., and on top of it, high pressure polyethylene [Sumikathene L-211 (density 0.925 g./cm.$^3$, melt index 2, product of Sumitomo Chemical Co., Ltd.)] having incorporated therein titanium oxide in an amount of 7.5% was coated in a thickness of 25$\mu$ at 280° C. The resulting resin-coated paper was designated as Sample 1.

On the other hand, Sumikathene L-211 with 7.5% titanium oxide was coated on paper of the same quality in a thickness of 40$\mu$ at 320° C. same as the upper layer of Sample 1. The resulting resin-coated paper was designated as Sample 2.

The bond strength between paper and the resin layer was as follows:

Bond strength (g.)
```
Sample 1 _____ ¹ 232
Sample 2 _____   148
```
¹ No strip-off was observed at the interface of polyethylene layers.

The photographic emulsion described above was coated on these two supports, and they were left to stand for 48 hours at 50° C. and 80% RH. The fog density of Sample 1 measured then was 0.2, whereas it was 1.3 in Sample 2.

It is seen therefore that the support produced by the process of the invention has superior adhesion between paper and the resin layer, and gives photographic paper with good photographic properties, as compared with the conventional supports for photographic paper.

Example 2

A polyethylene-coated paper (designated as Sample 1) was prepared under the same conditions as in Example 1 except that 10% of titanium oxide was added to polyethylene for use as an upper layer and this resin was extruded on paper at 270° C. in a thickness of 15$\mu$.

A comparison sample (designated as Sample 2) was produced by extruding a resin same as the upper layer of Sample 1 a thickness of 40$\mu$ at 320° C.

The bond strength between paper and the resin layer and the fog density were measured. The results are shown below.

|  | Bond strength (g.) | Fog density |
|---|---|---|
| Sample: | | |
| 1 | 232 | 0.3 |
| 2 | 148 | 1.5 |

Sample 2 was found inferior in both properties determined.

Example 3

Polyethylene NUC-8008 (density 0.916 g./cm.$^3$, melt index 5, product of Nippon Unicar Co., Ltd.) was coated on paper having a unit weight of 170 g./cm.$^2$ in a thickness of 10$\mu$ at 340° C., and on top of it, low pressure polyethylene Sholex (density 0.96 g./cm.$^3$, melt index 5, product of Nippon Olefin Chemical Co., Ltd.) was coated in a thickness of 30$\mu$ at 290° C. The resulting resin-coated paper was designated as Sample 1.

As a comparison sample, polyethylene same as the upper layer of Sample 1 was coated on the same paper in a thickness of 40$\mu$ at 340° C. The resulting paper was designated as Sample 2.

The bond strength between the resin layer and paper and the fog density were measured. The results are shown below.

|  | Bond strength (g.) | Fog density |
|---|---|---|
| Sample: | | |
| 1 | 150 | 0.3 |
| 2 | 85 | 1.5 |

The Comparison Sample 2 was found inferior in both of the properties determined.

What is claimed is:

1. An extrusion process for preparing a resin-coated paper useful as a support for a photographic paper, wherein the resin-layer is on the side of said paper to be coated with the photographic emulsion take the form of a first layer and a second layer, which comprises:
    (1) coating the first resin layer onto said paper at an extrusion temperature greater than 320° C. so as to provide sufficient adhesion between the paper and the first layer, and
    (2) subsequently, extrusion coating a second resin layer onto said first resin layer at a temperature below 300° C. so as to prevent decomposition and oxidation of the resin,
        said first resin of said first resin layer being a member selected from the group consisting of low density polyethylene having a high melt index, an ethylene-vinyl acetate copolymer, and an ethylene-acrylic acid copolymer, and
        said second resin of said second resin layer being a member selected from the group consisting of low density polyethylene and high density polyethylene.

2. A process as claimed in claim 1 in which said paper is the high quality paper having a thickness of 100 to 250$\mu$.

3. A process as claimed in claim 1 in which said first resin layer or the second resin layer contains pigments, dyestuffs, fluorescent brightening agents or antistatic agents.

References Cited

UNITED STATES PATENTS

| | | | |
|---|---|---|---|
| 3,161,519 | 12/1964 | Alsup _____ | 96—85 |
| 3,253,922 | 5/1966 | Chu et al. _____ | 96—85 |
| 3,295,979 | 1/1967 | Secrist et al. _____ | 96—85 X |
| 3,411,908 | 11/1968 | Crawford et al. _____ | 96—85 X |
| 3,525,621 | 8/1970 | Miller _____ | 96—85 |
| 3,531,314 | 9/1970 | Kerr et al. _____ | 96—85 X |
| 3,549,406 | 12/1970 | Ambusk _____ | 96—85 X |
| 3,582,339 | 6/1971 | Martens et al. _____ | 96—85 X |
| 3,615,550 | 10/1971 | Kemme _____ | 96—85 |

WILLIAM D. MARTIN, Primary Examiner

M. R. LUSIGNAN, Assistant Examiner

U.S. Cl. X.R.

96—75, 85, 87 R; 117—155 UA